March 21, 1961 J. P. ECKERT, JR 2,976,425

MAGNETIC QUARTER ADDERS

Filed Nov. 9, 1954 2 Sheets-Sheet 1

INVENTOR

JOHN PRESPER ECKERT, JR

BY

ATTORNEY

March 21, 1961 J. P. ECKERT, JR 2,976,425

MAGNETIC QUARTER ADDERS

Filed Nov. 9, 1954 2 Sheets-Sheet 2

INVENTOR
JOHN PRESPER ECKERT, JR.

BY Ejerry Light

ATTORNEY

United States Patent Office 2,976,425

Patented Mar. 21, 1961

2,976,425

MAGNETIC QUARTER ADDERS

John Presper Eckert, Jr., Philadelphia, Pa., assignor to Sperry Rand Corporation, a corporation of Delaware Filed Nov. 9, 1954, Ser. No. 467,798

20 Claims. (Cl. 307—88)

The present invention relates to computing apparatuses and is more particularly concerned with devices capable of performing quarter addition in binary digital applications. In particular, the present invention is primarily concerned with the provision of quarter adders utilizing carrier type magnetic amplifiers.

The mathematical process known as quarter addition may be understood by referring, for instance, to the following truth table:

| | | Input A | |
|---|---|---|---|
| | | 1 | 0 |
| Input B | 1 | 0 | 1 |
| | 0 | 1 | 0 |

As will be seen from an examination of the foregoing table, and considering that Input A and Input B represent electrical signals, the presence of one or the other, but not both, of two input signals effects an output signal; while simultaneity of either the presence or absence of the said two input signals results in there being no output signal.

Units capable of performing quarter addition in accordance with the preceding truth table form a basic portion of more complex computation devices. In the past, such quarter adders have utilized vacuum tube circuitry for the most part and have accordingly been subject to the disadvantages that they are relatively fragile in configuration and are subject to operating failures. The present invention serves to obviate the foregoing difficulties, and in essence provides a quarter adder structure utilizing carrier type magnetic amplifiers as a portion thereof.

It is accordingly an object of the present invention to provide improved quarter adders for use in computing applications.

A further object of the present invention resides in the provision of an improved quarter adder device which is more rugged in construction and which is less subject to operating failures than has been the case heretofore.

Still another object of the present invention resides in the provision of quarter adders employing carrier type magnetic amplifiers as a component thereof.

Still another object of the present invention resides in the provision of a computation device comprising in combination a magnetic amplifier and a bridge input or output circuit whereby the mathematical process known as quarter addition may be performed electrically.

A still further object of the present invention resides in the provision of devices which are selectively responsive to the simultaneity or lack thereof of two input signals whereby a characteristic output signal may be selectively obtained in accordance with the principles of quarter addition.

As has been mentioned previously, in effecting the foregoing objects and advantages of the present invention, carrier type magnetic amplifiers may be utilized in the provision of an improved quarter adder. Such carrier type magnetic amplifiers may take the form of two-core self-saturating magnetic amplifiers; or may be of the type known as the single-ended magnetic amplifier. Each of these configurations may be utilized in the practice of the present invention and their operation in this respect will become more apparent as the description proceeds.

Carrier type magnetic amplifiers such as may be utilized in the present invention ordinarily comprise a magnetic core or cores having plural windings thereon. The said windings are in turn respectively coupled to a source of alternating carrier wave potential as well as to a source of input signals, and means are further provided for keeping the said amplifiers from operating on a saturated portion of its hysteresis loop in the absence of a signal input thereto. The source of alternating carrier potential is, in practice, of a much higher frequency than is the signal input. The operating characteristics of carrier type magnetic amplifiers are in fact closely analogous to those of vacuum tubes in that an increase in signal input will cause an increased output, while a decrease in signal input will, in turn, decrease the amplifier output. Such carrier type magnetic amplifiers may be employed in the present invention to provide quarter adder structures, and in this respect the present invention contemplates the combination of such a carrier type amplifier and a bridge input or output circuit whereby when only one of two possible inputs is presented to the combined structure, an output will be produced, while if no input is presented thereto or two inputs are simultaneously presented thereto, no output will occur from the combination.

The foregoing objects, advantages, construction and operation of the present invention will become more readily apparent from the following description and accompanying drawings in which.

Figure 1:
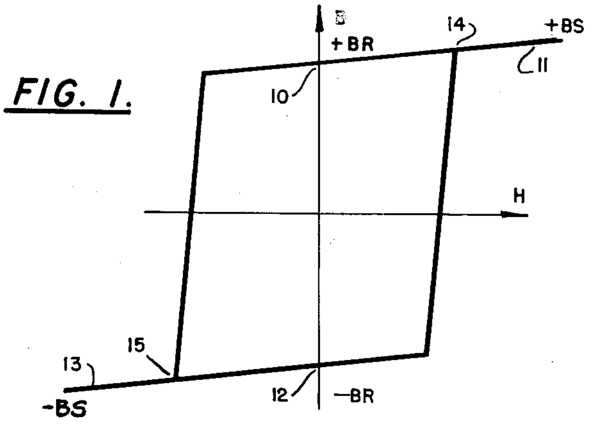
Figure 1 is an idealized hysteresis loop of a magnetic material which may preferably be employed in the cores of magnetic amplifiers utilized in the present invention.

Referring now to the hysteresis loop shown in Figure 1, the operation of magnetic amplifiers in accordance with the present invention may be readily seen. Such magnetic amplifiers may preferably but not necessarily utilize magnetic cores exhibiting a substantially rectangular hysteresis loop and these cores may be made of a variety of materials, among which are the various types of ferrites and various kinds of magnetic tapes, including Orthonik and 4–79 Moly-permalloy. These materials may further be given different heat treatments to effect different desired properties. In addition to the wide variety of materials applicable, the cores of the magnetic amplifiers to be discussed may be constructed in a number of different geometries including both closed and open paths. For example, cup-shaped cores, strips of material or toroidal cores may be used. It must be emphasized, however, that the present invention is not limited to any specific geometries of its cores nor to any specific hysteretic configuration therefor and the examples to be given are illustrative only.

Referring now to the hysteresis loop shown in Figure 1, it will be noted that the curve exhibits several significant points of operation, namely, point 10 (+B*r*) which represents a point of plus remanence; the point 11 (+B*s*) which represents plus saturation; the point 12 (−B*r*) which represents minus remanence; the point 13 (−B*s*) which represents minus saturation; the point 14 which represents the beginning of the plus saturation region; and the point 15 which represents the beginning of the minus saturation region.

Discussing for the moment the operation of a device utilizing a core which exhibits a hysteresis loop such as has been shown in Figure 1, let us initially assume that a coil is wound on the said core. If the core should be at the operating point 10 (plus remanence) and if a voltage pulse should be applied to the said coil, which pulse produces a current creating a magnetomotive force in a direction tending to increase the flux in the said core (i.e. in a direction of +H), the core will tend to be driven from the said operating point 10 (+B*r*) to the region of point 11. During this state of operation there is relatively little flux change through the said core and the coil therefore presents a relatively low impedance whereby energy fed to the said coil during this state of operation will pass readily therethrough and may be utilized to effect a usable output.

On the other hand, if the magnetic core should initially be at an operating point 12 (−B*r*) prior to the application of the +H pulse discussed previously, upon application of such a pulse the core will tend to be driven from the said point 12 to the region of plus saturation. The pulse magnitude should preferably be so selected that the core is driven only to the beginning of the plus saturation region, namely, to point 14. During this particular state of operation there is a very large flux change through the said core and the coil therefore exhibits a relatively high impedance to the applied pulse. As a result, substantially all the energy applied to the coil when the core is initially at its −B*r* operating point 12 will be expended in flipping the core from the said point 12 preferably to the operating point 14, and thence to the operating point 10, with very little of this energy actually passing through the said coil to give a useful output. Thus, depending upon whether the core is initially at point 10 (+B*r*) or point 12 (−B*r*), an applied pulse in the +H direction will be presented respectively with either a low impedance or a high impedance and will effect either a relatively large output or a relatively small output. These considerations are of value in the construction of carrier type magnetic amplifiers in accordance with the present invention.

Figures 2, 3:
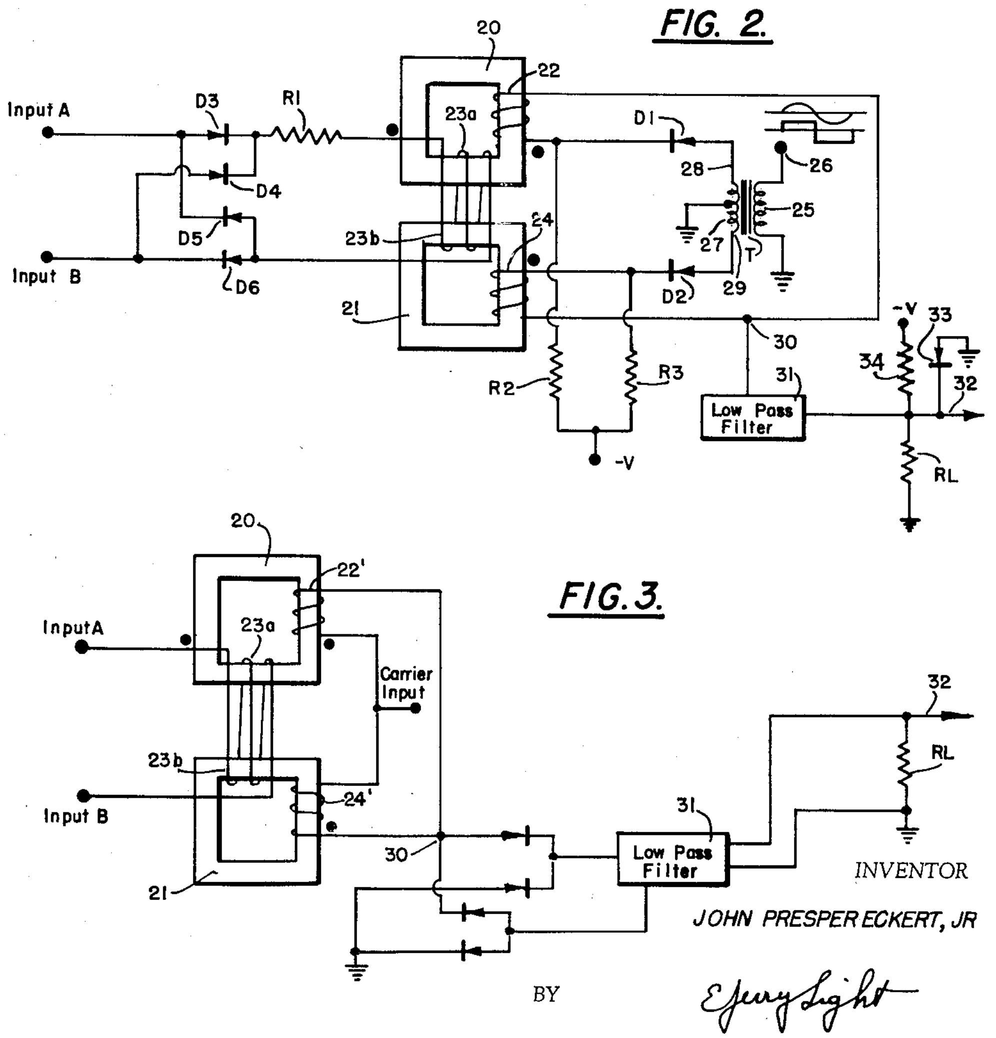
Figure 2 is a circuit diagram of a two-core self-saturating magnetic amplifier connected as a quarter adder in accordance with one form of the present invention.
Figure 3 is a circuit diagram of a two-core self-saturating magnetic amplifier connected as a quarter adder in accordance with another form of the present invention.

Referring now to Figure 2, it will be seen that a two-core self-saturating carrier type magnetic amplifier such as may be utilized in the practice of the present invention may comprise two cores 20 and 21, preferably but not necessarily exhibiting a hysteresis loop substantially similar to that discussed in reference to Figure 1. Core 20 carries two windings thereon, namely, windings 22 and 23*a* and core 21 carries two further windings thereon, namely, windings 23*b* and 24. As is apparent from the foregoing construction, the windings 23*a* and 23*b* comprise essentially a single winding carried by each of the cores and the function of this construction will become apparent as the description proceeds. It is also permissible for windings 23*a* and 23*b* to be separate windings connected in series so that the magnetic effect of a current flowing through them is the same as that produced by the configuration shown.

The amplifier of Figure 2 is energized from a source of carrier voltage comprising a transformer T having a primary winding 25, one end of which is preferably grounded and the other end of which is connected to a terminal 26 supplied by a source of alternating carrier potential which may be as shown, of either a sinusoidal, squarewave, or other alternating waveform. The transformer T further has a secondary winding 27 center tapped as shown. The upper end 28 of the winding 27 is coupled via a rectifier D1 to one end of the amplifier winding 22 and the lower end 29 of the said secondary transformer winding 27 is coupled via a further rectifier D2 to one end of the amplifier winding 24. The other ends respectively of the amplifier windings 22 and 24 are coupled to a terminal 30 and thence via low pass filter 31 to an output point 32, the amplifier output appearing across a load impedance RL. The amplifier windings 22 and 24 are further coupled as shown via resistors R2 and R3 respectively to a source of negative potential −V, the function of which will become apparent.

Winding 23*a*—23*b* acts as a signal input winding for the two-core magnetic amplifier shown; and one end of the said winding is coupled via resistor R1 to one terminal of a rectifier bridge input comprising rectifiers D3, D4, D5 and D6. The other end of the combined windings 23*a*—23*b* is also coupled to the said rectifier bridge and two inputs, termed Input A and Input B, are also coupled to the said rectifier bridge.

Disregarding for the moment the operation of the input circuit shown, let us assume that the magnetic core 20 is initially at its minus remanence operating point 12 while the magnetic core 21 is initially at its plus remanence operating point 10. If now a carrier potential applied via transformer T to the center tapped secondary winding 27 should be positive at the point 28 and negative at the point 29, a current will tend to flow via diode D1 to the amplifier winding 22 and this current produces a magnetizing force in a +H direction. The core 20 will therefore move from its minus remanence operating point 12 to the region of plus saturation, preferably to the operating point 14 and thence to the plus remanence operating point 10 during the positive going half cycle of the applied carrier potential. The resultant flux change in core 20 will tend to induce a voltage in the combined winding 23*a*—23*b*. However, diode D2 is biased off and there is a simultaneous flow of current from ground, through rectifier 33, low pass filter 31, winding 24 on core 21, and resistor R3 to source of negative potential −V, which will apply a magnetomotive force to core 21 in the negative direction, resetting core 21 to its B*r* operating point 12, preferably, via operating point 15, and which will thus produce a flux change in core 21 substantially equal in magnitude to the above described flux change in core 20. Examination of the winding directions of coils 22, 23*a*—23*b*, and 24 will reveal that the flux changes in cores 20 and 21 have opposite effect upon coil 23*a*—23*b* and that there is thus no substantial voltage induced in coil 23*a*—23*b*.

Upon reversal of polarity of the applied carrier potential at the transformer secondary winding 27, the point 29 will become positive while the point 28 will become negative. A current will accordingly flow via diode D2 and winding 24 of the amplifier core 21 during this second half cycle of applied carrier potential. However, at this time the core 21 has been moved to its −B*r* operating point whereby the magnetizing force applied to the core 21 by current flowing through the winding 24 will merely cause the said core 21 to move from its −B*r* operating point 12 to its +B*r* operating point 10, preferably via the point 14. The current flowing in winding 24 during this second half cycle of applied carrier potential will tend to induce a voltage in winding 23*b* by virtue of the flux change in core 21. However, rectifier D1 is biased off by the negative potential of terminal 28 and a current flows from ground through rectifier 33, low pass filter 31, winding 22, and resistor R2 to source of negative potential —V. This current produces a magnetomotive force on core 20 in the negative direction, resetting core 20 to operative point 12 via operative point 15, and again, it will be apparent that there is no substantial flux change linked by the combined winding 23a—23b, and hence, no substantial voltage induced therein. The applied alternating carrier potentials will cause each of the cores 20 and 21 to traverse its respective hysteresis loop without providing any substantial output via terminal 30 and low pass filter 31 to the output point 32. This first condition of operation may be considered the "no signal" input state and satisfies the condition that without any inputs at either Input A or Input B there will be no output pulse from the combination.

Before examining the signal input circuit and the effect of signals applied thereto, several further design considerations should be noted. In practice, the traverse by each of the said cores 20 and 21 of its respective hysteresis loop between the operating points 12 and 10 will, as has been mentioned previously, produce no usable output. However, it should be noted that a small current must of necessity flow during this operation and in the absence of suppression this small current flow would effect a small output termed a sneak output. Such sneak outputs are in fact suppressed in the circuit shown by the arrangement of resistor 34 in combination with the source of negative potential —V, the diode 33, and its ground connection. This suppression is effected by so choosing the magnitude of resistor 34 that, in the absence of a usable output from either of the windings 22 and 24, a current will normally flow from ground through the diode 33 and the resistor 34 to the source of negative potential —V. The value of this current is selected, by proper choice of the magnitude of resistor 34, to be equal to or greater than the magnitude of sneak current to be suppressed whereby only potentials substantially larger than the said sneak outputs may appear at terminal 30 of the magnetic amplifier.

Again, as has been mentioned previously, the applied carrier valve potential is of a substantially higher frequency than are either of the signal sources coupled to the inputs A and B shown; and the output signal selectively appearing at the terminal 30 will once more be of a much lower frequency than that of the carrier wave potential. The low pass filter 31 is provided to prevent the coupling of carrier wave potentials directly to the amplifier output terminal 32. Finally, and as is well known, the rise time of a reactive circuit comprising inductance and resistance is dependent in part upon the value of the said resistance present in the circuit. The resistance R1 is therefore provided as shown and is termed a "forcing" resistance. The function of resistance R1 is to decrease the rise time of the overall amplifier. It should be noted however that this descreased rise time is effected at the cost of increased power loss across the resistance R1 and therefore the energy content of signals applied via the signal sources coupled to Input A and Input B must be increased accordingly.

Let us now examine the operation of the system shown in Figure 2 in respect to its functioning as a quarter adder. As was established in the preceding discussion, if no signals are applied to either Input A or to Input B, there will effectively be no output at the amplifier output terminal 32. If, however, a signal should be coupled to Input A only, the signal so applied will cause a current to flow via diode D3 and resistor R1 to the winding portion 23a and thence through the winding portion 23b to the Input B via diode D6. The current so flowing due to an applied input signal will tend to oppose the reverting effect of the current from diode 33 through windings 22 and 24 and resistors R2 and R3, respectively, and therefore within a relatively few cycles of applied carrier potential an output will be coupled via the low pass filter 31 to the output terminal 32.

By a similar analogy a signal input at the Input B will be coupled via diode D4 and the resistor R1 to the winding 23a—23b and thence via diode D5 to the Input A terminal. The signal so applied to Input B effects a current flow through the winding 23a—23b in the same direction as did the signal applied from Input A and therefore will have the same effect upon the operation of the device. Thus, once more, a signal will appear at the output of the amplifier system. The bridge rectifier thus permits one to apply a signal input at either Input A or Input B and the application of a signal at either of these terminals will have the same output effect upon the amplifier whereby an output will appear at the terminal 32. It should be noted in this respect that inasmuch as the return path for a signal applied at Input A is in part via the signal source coupled to Input B and vice versa, each of the signal sources applied to the Input B terminals should preferably be a low impedance source, and in this respect a low impedance source is defined as one capable of receiving a reverse current flow at its output terminals.

If signals should be applied simultaneously at Input A and at Input B, however, both input terminals of the input bridge rectifier will be raised to effectively the same potential whereby no current may flow through the said bridge and no signal will be effectively applied to the amplifier.

Summarizing the foregoing, therefore, it will be seen that the application of a signal at either Input A or Input B will effect a signal output at the terminal 32. However, the simultaneous application of signals to both Input A and Input B, or a simultaneous lack of signals at both of the Input A and Input B terminals, will result in there being no output at terminal 32. The arrangement thus acts in conformity with the truth table given previously, and therefore functions as a quarter adder.

The arrangement of Figure 2 may be modified in certain respects as is shown in Figure 3 without changing the operation of the device. Thus, the Input A and Input B terminals need not be coupled to the signal input winding 23a—23b via the bridge input circuit as has been discussed in reference to Figure 2, but may in fact be coupled directly to opposite ends of the said input signal winding as is shown in Figure 3. This change in configuration will result in an output signal of one polarity appearing at the terminal 30 when a signal input appears on the Input A line and a signal output of the opposite polarity appearing at the said terminal 30 when the input signal is on the Input B line. A simultaneous application of signals at the Input A and Input B terminals will effect nullification of the applied signals in the signal winding 23a—23b whereby, as before, no output signal will appear. Obviously, if no input signal is applied at either Input A or Input B, then again no output signal will appear.

Inasmuch as the polarity of the output signal appearing at terminal 30 is dependent upon which of the Input A or Input B lines is energized, the quarter adder of Figure 3 is further modified by providing a bridge rectifier in the output circuit thereof coupled to the said terminal 30. This bridge rectifier, as shown, is of well known configuration and serves to convert the signals appearing at the terminal 30 to an ultimate signal output at the terminal 32 which is of a fixed and predetermined polarity with respect to ground. Due to the difference in operation of the quarter adders of Figures 2 and 3, it will be noted that the winding 24′ shown in Figure 3 is in effect reversely wound to that of the corresponding winding shown in Figure 2. Thus, the power windings 22′ and 24′ of the amplifier of Figure 3 are in parallel with one another. It should further be noted that the carrier input utilized in Figure 2, comprising a transformer T and diodes D1 and D2, may be replaced by a direct-coupled input as shown in Figure 3 without substantially affecting the operation of the device. Once more it will be understood that sneak suppressor circuits should preferably be employed with the circuit of Figure 3 but such circuits have been omitted for simplicity of representation. It should be observed that in the circuit of Figure 3, the same voltage will appear across windings 22' and 24', so that, if there is no input at terminals A and B, both cores will be driven around the loop of Figure 1, over the path 12, 14, 10, 15, 12. However, an input to either A or B will cause one core to present a low impedance to positive carrier input and the other core to present a low impedance to negative carrier input, thus giving alternate positive and negative outputs to the bridge rectifier. Under the condition of input to one terminal, the drop across the windings 22' and 24' will be small, so that neither core 20 nor 21 will undergo much reversion, giving a regenerative action over a large number of carrier cycles.

While the power windings 22' and 24' of the quarter adder shown in Figure 3 have been described as connected in parallel, this is not mandatory to proper operation of the device and in fact the said power windings may be connected in series with one another. Thus, referring to Figure 4, it will be seen that the same arrangement as that discussed in reference to Figure 3 may be provided with the sole exception that the power windings 40 and 41 are connected in series with one another rather than in parallel as was the case in respect to power windings 22' and 24' of Figure 3. The arrangement of Figure 4 operates much the same as that of Figure 3 with the exception that the output appearing at terminal 42 is of less magnitude than is that appearing at output point 32 in Figure 3. The device still acts as a quarter adder, however, in that a signal input to the Input A or Input B terminal will produce an output signal at terminal 42, while the simultaneous application of signals at both Input A and Input B, or the lack of signal inputs at both Input A and Input B will produce no output signal at the said output terminal 42. Thus, the arrangements shown in Figures 2, 3 and 4, by utilizing a two-core self-saturating magnetic amplifier, preferably in combination with a bridge rectifier in either the input circuit or output circuit thereof, effects a quarter adder device capable of being employed in binary digital computations.

While the foregoing discussion has been directed primarily to the use of two-core self-saturating magnetic amplifiers, the present invention also may be applied to quarter adders utilizing single-ended carrier type magnetic amplifiers. Thus, referring to Figure 5, for instance, it will be seen that such a single-ended carrier type magnetic amplifier may comprise a magnetic core 50 having a power or output winding 51 thereon and further having a signal or input winding 52. One end of the said power winding 51 is coupled via a diode D7 to a power input terminal 53 to which terminal is coupled an alternating carrier source of the type discussed in reference to Figure 2. The lower end of the power winding 51 is coupled to an output terminal 54 via a low pass filter 55 and the said low pass filter 55 again serves to exclude the relatively high frequency carrier input from the output circuit. Both the upper and lower ends of the power winding 51 are coupled to a source of negative potential —V via resistors R4 and R5 respectively, and a diode D8 is coupled from the lower end of power winding 51 to ground. Signal or input winding 52 is coupled via low pass input filter 56 to a bridge input circuit of the type discussed in reference to Figures 2, 3 and 4, and two sources of possible signal inputs are coupled via the Input A and Input B terminals shown to the said bridge input circuit.

Figures 4, 5:
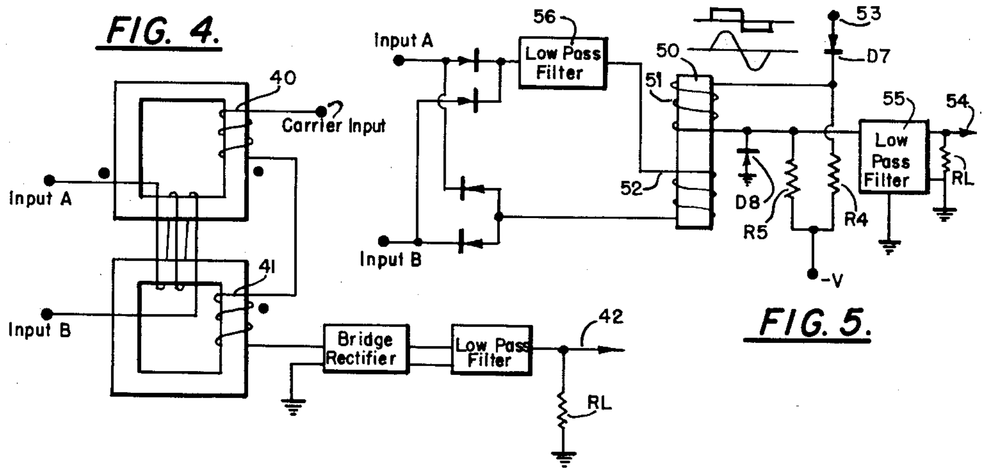
Figure 4 is a circuit diagram of a two-core self-saturating magnetic amplifier connected as a quarter adder in accordance with still a further embodiment of the present invention.
Figure 5 is a circuit diagram of a quarter adder in accordance with the present invention utilizing a single-ended carrier type magnetic amplifier.

Discussing the operation of the single-ended carrier type magnetic amplifier shown in Figure 5, it will be seen that the said circuit operates essentially as a non-complementing type magnetic amplifier. Thus, assuming that the magnetic core 50 is initially at its minus remanence operating point 12, the application of a positive going power pulse via the power terminal 53 and diode D7 during the first half cycle of applied carrier potential will cause a current to flow through the said power winding 51 whereby the core 50 will be flipped from its said minus remanence operating point 12 to its plus remanence operating point 10. During the next half cycle of applied carrier potential, when the potential of point 53 goes negative, the diode D7 will be effectively cut off and a reverse current flow will pass from ground via the diode D8 and thence through power winding 51 and resistor R4 to the source of a negative potential —V. This reverse current flow through power winding 51 will cause the core 50 to be flipped from its plus remanence operating point 10 to its minus remanence operating point 12 preparatory to application of the next positive going half cycle of applied carrier potential. Thus, in the absence of signal inputs, the core 50 will be caused to merely traverse its hysteresis loop without producing a usable output. The combination of diode D8 and resistor R5 again acts as a sneak suppressor circuit in accordance with the discussion of Figure 2.

If now an input signal should be applied to the Input A terminal or to the Input B terminal, this single input signal will pass via the low pass filter 56 to the signal winding 52 and will effectively counteract the reverting tendency of the reverse current flow through power winding 51. The device will therefore once more commence producing an output which will appear at the output terminal 54 in accordance with the principles set forth previously. The bridge input circuit utilized in Figure 5 again acts as did the corresponding input circuit of Figure 2, in that a single input at either Input A or Input B will produce a current flow in the same predetermined direction through the signal winding 52 thereby to effect a signal output from the amplifier. Simultaneous application of signals to both Input A and Input B, however, will as before raise the opposite input points of the bridge input circuit to substantially the same potential whereby no current will flow therethrough and no signal will be effected at the output terminal 54. Again, therefore, the device acts as a quarter adder.

The low pass filters 56 and 55 serve to isolate both the input and output circuits from the carrier frequency. These low pass filters may take the form of any of the passive linear devices known in the prior art. It should further be noted that in certain of the devices in accordance with the present invention, and particularly those of Figures 5, 6 and 7, low pass filters are preferably utilized in both the input and output circuits. If devices such as have been shown are to be cascaded, duplication of filters is not necessary, however.

Figure 6:
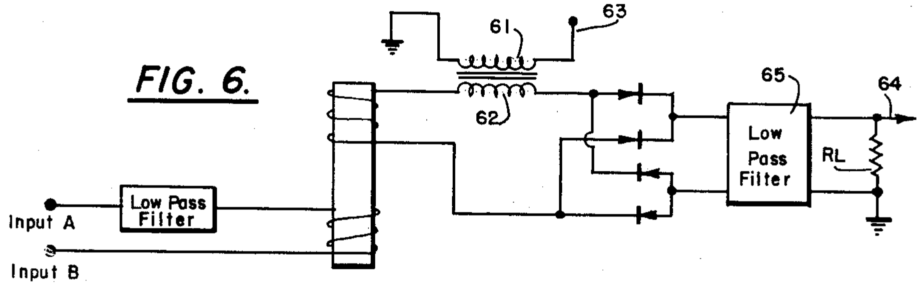
Figure 6 is still another embodiment of the present invention utilizing a single-ended carrier type magnetic amplifier as a quarter adder.
Figure 7:
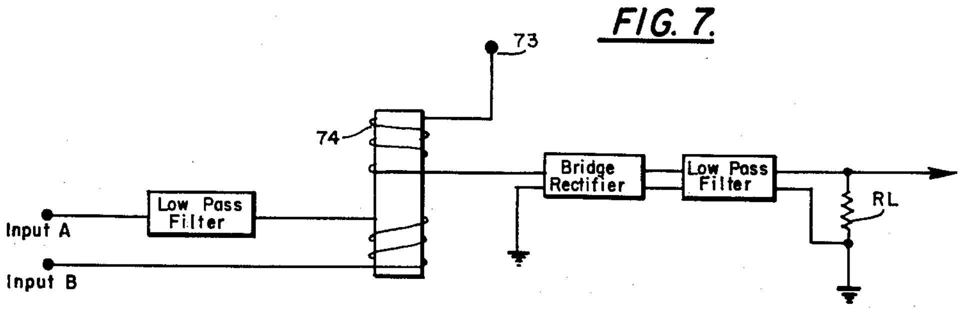
Figure 7 is a further quarter adder device in accordance with the present invention, again utilizing a single-ended carrier type magnetic amplifier.

The arrangement of Figure 6 effectively corresponds in respect to a single-ended carrier type magnetic amplifier, to the arrangement of Figure 3 in respect to the two-core self-saturating magnetic amplifier. Thus, in the arrangement of Figure 6 the rectifier bridge has been removed from the input circuit and, as a result, signals applied to the Input A and Input B terminals will respectively produce output signals of opposite polarities. This variation in output polarity is overcome by an output bridge, as is shown in Figure 6, whereby an output signal of but a single polarity is passed via the low pass filter 65 to the output terminal 64. The arrangement of Figure 6 further illustrates that the source of power pulses may be coupled from a power terminal 63 to a transformer comprising a primary winding 61 and a secondary winding 62, and such a transformer arrangement may be utilized in place of the diode coupling of Figure 5. Even this arrangement, however, is not mandatory and the power source may in fact be coupled, as is shown in Figure 7, from a power terminal 73 directly to the power winding 74 shown. Again sneak suppressors in accordance with the preceding discussion should be supplied but these have been omitted for simplicity of representation. In Figures 6 and 7, reversion of the core is effected by the reversal of the carrier voltage, since the bridge rectifier will pass input current in either direction.

While I have described preferred embodiments of the present invention, it must be understood that the foregoing description is meant to be illustrative only and is not limitative of my invention. Many variations will be suggested to those skilled in the art and such variations which are in accord with the principles discussed previously, are meant to fall within the scope of the present invention as set forth in the appended claims.

Having thus described my invention, I claim:

1. A quarter adder comprising a carrier type magnetic amplifier, said amplifier including a magnetic core having saturated and unsaturated operating regions, an input winding and an output winding on said core, a source of alternating energizing potential coupled to said output winding, said amplifier being responsive to a resultant signal at said input winding such that said core operates in a saturated operating region thereof, thereby to pass an output signal from said energizing source via said output winding, a first source of selective input signals coupled to said input winding, a second source of selective input signals coupled to said input winding, the frequency of said energizing source being substantially higher than that of said input sources, said first and second input sources being coupled to opposite ends of said input winding that the simultaneous occurrence of input signals from both of said sources results in there being no resultant signal in said input winding, said amplifier being responsive to an input signal applied from one only of said input sources such that said input winding has a resultant signal applied thereto and said core is caused to operate in a saturated operating region thereof to produce said output signal only in response to occurrence of a signal from one only of said first and second sources, low pass filter means coupling said output winding to said output terminal for isolating signals having the frequency of said energizing source from said output terminal whereby said output signal at said output terminal contains substantially no components at the frequency of said energizing source, and rectifier bridge means connected in series with one of said windings of said amplifier for controlling the polarity of said output signal so that an output signal of predetermined polarity and relatively low frequency appears at said output terminal in response to an input signal from only one of said first and second sources.

2. The quarter adder of claim 1 in which said rectifier means comprises a full-wave bridge rectifier interposed between said input signal sources and said input winding.

3. The quarter adder of claim 1 in which said rectifier bridge means comprises a full-wave rectifier bridge interposed between said output winding and an output terminal.

4. A magnetic quarter adder comprising a magnetic amplifier including a magnetic core exhibiting a rectangular hysteresis characteristic and thereby having saturated and unsaturated operating regions, a power winding for receiving power pulse signals and a signal winding for receiving input signals on said core, a source of alternating carrier potential coupled to one end of said power winding for supplying power pulse signals thereto, an output terminal coupled to the other end of said power winding, whereby variations in the saturation state of said core cause said power winding to present a varying impedance between said carrier source and said output terminal, means for controlling the saturation state of said core comprising first and second signal sources coupled to said signal winding, the frequency of said alternating source being substantially higher than the frequency of either of said signal first and second sources, said amplifier including means responsive to a resultant signal applied to said signal winding from said signal sources for causing said core to operate in a saturated operating region thereof thereby permitting said carrier potential source to produce an output potential at said output terminal, said amplifier including flux producing means for causing said core to operate in an unsaturated operating region thereof thereby to prevent said carrier potential source from producing an output potential at said output terminal in the absence of a resultant signal from said sources at said signal winding, and a bridge rectifier connected in series with one of said windings on said amplifier whereby a signal from one or the other of said signal sources will produce an output signal of predetermined polarity at said output terminal.

5. The quarter adder of claim 4 in which said bridge rectifier is connected between said power winding and said output terminal.

6. The quarter adder of claim 4 in which said bridge rectifier is connected between both of said signal sources and said signal winding.

7. The combination of claim 4 in which said amplifier comprises a single-ended carrier type magnetic amplifier, said flux producing means including a source of direct potential coupled to said power winding and causing a current to flow through said power winding during predetermined portions of the applied carrier potential cycle.

8. The combination of claim 4 including a low pass filter coupled between said power winding and said output terminal for preventing signals at the frequency of said carrier source from appearing at said output terminal.

9. The combination of claim 8 including a further low pass filter coupled between said signal winding and said signal sources.

10. The combination of claim 4 in which said amplifier comprises a two-core self-saturating magnetic amplifier, said signal winding being carried by both of said magnetic cores.

11. The combination of claim 10 wherein said signal sources are low impedance sources capable of receiving a reverse current flow at their output terminals.

12. The combination of claim 4 in which said source of alternating carrier potential is transformer coupled to said power winding.

13. The combination of claim 4 in which said source of alternating carrier potential is coupled via buffer means to said power winding.

14. A quarter adder comprising a carrier type magnetic amplifier including a magnetic core capable of assuming stable remanence conditions, a power winding and a signal winding on said core, first and second signal sources coupled to said signal winding via a bridge rectifier input circuit whereby a signal from either of said signal sources causes a current to flow in a predetermined single direction through said signal winding thereby to control the operation of said core, a source of alternating carrier potential coupled to one end of said power winding, said alternating source having a repetition rate substantially higher than that of either of said signal sources, an output terminal coupled via low pass filter means to the other end of said power winding, whereby said carrier source is selectively operative to pass currents via said power winding to said output terminal depending on the operation of said core as controlled by the signal state of said first and second signal sources, said low pass filter means being operative to prevent currents at the frequency of said carrier source from appearing at said output terminal, said quarter adder being reponsive to a signal from one or the other of said sources for causing said core to operate in a first magnetic operating region thereof thereby to produce an output signal at said output terminal, and inhibiting means for causing said core to operate in a second magnetic operating region different from said first region thereby to inhibit an output signal at said output terminal upon simultaneous presence or absence of signals from both of said sources.

15. The quarter adder of claim 14 in which said inhibiting means comprises means causing a current flow through said power winding, during a predetermined portion of the applied carrier potential cycle, in a direction reverse to that flowing through said power winding during the remainder of the said applied carrier potential cycle.

16. The quarter adder of claim 15 in which said core comprises a magnetic material exhibiting a substantially rectangular hysteresis loop.

17. A quarter adder comprising a carrier type magnetic amplifier including a magnetic circuit having a power winding and a signal winding, a rectifier bridge connected in series with one of said windings to determine the polarity of an output signal produced at said output winding, first and second signal sources coupled to opposite ends of said signal winding and having a signal cycle of a certain frequency, said signal sources being of effectively opposing polarities to one another with respect to said signal winding and of effectively similar polarities with respect to each other whereby a signal from one only of said sources effects a resultant current flow through said signal winding and the simultaneous presence or absence of signals from both said signal sources effects no resultant current flow in said signal winding, a source of alternating energizing potential coupled to one end of said power winding, said alternating source having a frequency which is substantially higher than that of either of said signal sources, and an output terminal coupled to the other end of said power winding whereby output signals are selectively passed from said alternating source to said output terminal via said power winding in accordance with the impedance of said power winding which is changed in response to resultant signal current flow in said signal winding.

18. The combination of claim 17 wherein said magnetic circuit comprises a pair of magnetic cores each of which comprises a magnetic material having saturated and unsaturated operating regions, said power winding and said signal winding being carried by both said cores.

19. The combination of claim 17 wherein said rectifier bridge means interposed between said first and second signal sources and said signal winding, whereby the same direction of resultant current flow through said signal winding is effected by signals from either of said signal sources.

20. An electromagnetic circuit comprising a magnetic element having saturated and unsaturated operating regions, said element being normally operative in one of said regions, first electrical signal input means for intermittently energizing said magnetic element thereby to cause said element to operate in the other of said regions, second electrical signal input means for intermittently energizing said magnetic element thereby to cause said element to operate in the other of said regions, electrical signal output means responsive to the energization of said magnetic element for generating an electrical output signal upon energization of only one of said signal input means, said output means having a first end and a second end, means for connecting said first end to a source of alternating energy having a repetition rate substantially higher than that of either of said first and second input means, means for connecting said second end to a load, said last named means including unidirectional conductive means for permitting the flow of energy through said load in only one direction, and means interconnecting said first and second electrical signal input means such that the generation of an output signal in said output means upon the simultaneous energization of both said first and second input means is prevented by causing the electrical signals from one of said input signal means to cancel the signals from the other of said input signal means.

References Cited in the file of this patent

UNITED STATES PATENTS

| | | |
|---|---|---|
| 2,695,993 | Haynes | Nov. 30, 1954 |
| 2,697,825 | Lord | Dec. 21, 1954 |
| 2,710,952 | Steagall | June 14, 1955 |
| 2,762,969 | Fingerett et al. | Sept. 11, 1956 |
| 2,786,147 | Kaufmann | Mar. 19, 1957 |
| 2,846,667 | Goodell et al. | Aug. 5, 1958 |